3,031,443
PROCESS FOR PREPARING A 3-NITRO-AZACY-
CLOALKANONE-2-N-CARBOCHLORIDE
Johannes H. Ottenheym, Sittard, and Johan P. H. Von
den Hoff, Geleen, Netherlands, assignors to Stamicar-
bon N.V., Heerlen, Netherlands
No Drawing. Filed Sept. 10, 1959, Ser. No. 839,074
Claims priority, application Netherlands Sept. 29, 1958
7 Claims. (Cl. 260—239.3)

The present invention relates to the preparation of 3-nitro-azacyclo-alkanone-2-N-carbochlorides from azacyclo-2,3,alkene-2,chloro-N-carbochlorides.

It has been found that high yields of 3-nitro-azacyclo-alkanone-2-N-carbochlorides can be obtained if azacyclo-2,3,alkene-2,chloro-N-carbochloride is brought into reaction with a nitrating acid and the reaction mixture is subsequently treated with water at a temperature below 50° C. so that an aqueous suspension is obtained, from which the resulting solid reaction product is separated.

The 3,nitro-azacyclo-alkanone-2-N-carbochlorides described herein are new compounds. The object of the present invention includes, therefore, the provision of these novel and useful compounds and procedures for making same.

According to the invention, nitrating acid is used for preparing these new compounds. The term "nitrating acid" denotes a composition containing nitric acid which is suitable for carrying out nitrating reactions. Use is generally made of nitrating acid consisting essentially of a mixture of concentrated sulphuric acid (e.g. at least 90% by weight acid) and concentrated nitric acid (e.g. at least 93% by weight acid). It is usual for such a mixture of acids to contain more sulphuric acid than nitric acid, e.g. 2 mol. of sulphuric acid per mol of nitric acid. However, the invention is not restricted to the use of nitrating acid of a definite composition and nitrating acid compositions generally suitable for nitrating reactions may be utilized.

The amount of nitrating acid may be varied. To obtain high yields, it is recommended that an amount of nitrating acid which corresponds with at least 2 mols of nitric acid per mol of azacyclo-2,3,alkene-2,chloro-N-carbochloride be used. A larger excess than, for instance, 3–5 mols of nitric acid per mol of the compound to be nitrated, is not needed and encumbers the recovery of the nitric acid. When anhydric nitrating acid is used, only 1 mol of nitric acid per mol of initial product is required. The expression "anhydric nitrating acid" as herein used means a mixture of nitric acid, sulphuric acid and sulphur trioxide, containing equimolecular amounts of nitric acid and sulphur trioxide.

The number of carbon atoms of the alkene hydrocarbon group in the original azacyclo-2,3,alkene-2,chloro-N-carbochlorides used as starting materials may be varied and may amount to e.g. 5, 6 or 7 carbon atoms. Examples of suitable compounds are azacyclo-2,3,hexene-2,chloro-N-carbochloride and azacyclo-2,3,heptene-2,chloro-N-carbochloride. The alkene hydrocarbon group may also contain more carbon atoms, e.g. 10, 11 or 12. From these carbochlorides the corresponding 3,nitro-azacyclo-alkanone-2-N-carbochlorides are obtained. Typically new compounds according to the invention are, therefore, 3,nitro-azacyclo-hexanone-2-N-carbochloride and 3,nitro-azacyclo-heptanone-2-N-carbochloride. These compounds may also be identified as 3,nitro-piperidine-2-one-N-carbochloride and 3,nitro-hexamethyleneimin-2-oxo-N-carbochloride, respectively.

The reaction with nitrating acid may be effected in any convenient fashion, for instance, by mixing the reaction components together. In this case, the temperature is preferably kept below room temperature to prevent the reaction from becoming too violent. In a preferred way of carrying out the process of the invention, the azacyclo-2,3,alkene-2,chloro-N-carbochloride is added to the nitrating acid, while the temperature is kept at 0–30° C. Stirring facilitates a smooth reaction.

After the reaction has been completed, the reaction mixture is treated with water so as to obtain an aqueous suspension of the reaction product. It is advantageous to add cold water or ice in order to maintain a low temperature, below 50° C. By this treatment with water, the final product is formed as a suspension in water, from which the desired solid product can be easily separated, for example, by filtration. Nitrating acid may again be prepared from the remaining aqueous phase.

The new compounds prepared according to the invention are 3,nitro-azacyclo-alkanone-2-N-carbochlorides as confirmed by analysis and optical examination. These compounds possess insecticidal characteristics and are particularly effective against such insects as flies or lice, for example on agricultural growth. Insecticides may be prepared using the present compounds as the active ingredient by mixing the same with an inert solid or liquid diluent, e.g. clay, water, oil etc. The compounds described herein may also be used as the starting materials for the purpose of preparing α-nitrolactams by the process described and claimed in our copending U.S. application Serial No. 239,080 filed on even date herewith.

The invention is illustrated, but not limited, by the following examples:

*Example 1*

To 185 g. of nitrating acid obtained by mixing 32 g. of 99% by weight of nitric acid and 153 g. of 96% by weight of sulphuric acid, 48.5 g. of azacyclo-2,3,heptene-2,chloro-N-carbochloride are added gradually. This addition is made with simultaneous stirring in 15 minutes while keeping the temperature at 10–15° C.

Subsequently 200 g. of ice are added to the viscous reaction mixture, with the result that a solid material is separated off. After the ice has been melted, the reaction mixture is filtered and the solid product obtained is washed with water until acid-free.

In this way 53 g. of 3,nitro-azacyclo-heptanone-2-N-carbochloride are obtained representing a yield of 96%.

*Example 2*

155 g. of azacyclo-2,3,heptene-2-chloro-N-carbochloride are added gradually during 20 minutes to 468 g. of anhydric nitrating acid (consisting of 64 g. nitric acid, 314 g. sulphuric acid and 80 g. sulphur trioxide). The temperature is maintained at 0–5° C.

Subsequently, 1 kg. of ice is added and the reaction mixture is stirred without external cooling until the ice is melted and an aqueous suspension is obtained. Upon filtering the suspension and washing the solid until free from acid, 176 g. of 3,nitro-azacyclo-heptanone-2-N-carbochloride are obtained (yield 100%).

Having described the invention, what is claimed as new is:

1. In a process for preparing 3,nitro-azacyclo-alkanone-2-N-carbochloride characterized by the formula:

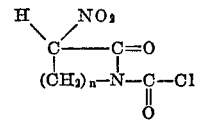

wherein $n$ is a whole number from 2 to 10 inclusive which comprises mixing together azacyclo-2,3,alkene-2, chloro-N-carbochloride of the formula:

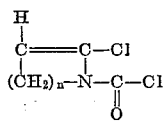

wherein $n$ has the value indicated above and nitrating acid consisting essentially of a mixture of nitric acid and sulphuric acid, subsequently treating the resulting reaction mixture with water at a temperature below 50° C. so that an aqueous suspension is obtained and separating the desired product from said suspension.

2. A process according to claim 1 wherein the nitrating acid consists essentially of a mixture of nitric acid, sulphuric acid and sulphur trioxide.

3. A process according to claim 1 wherein the azacyclo-2,3,alkene-2,chloro-N-carbochloride is added to the nitrating acid while the temperature is kept at 0–30° C.

4. A process according to claim 1 wherein at least 2 mols but not more than 5 mols of nitric acid per mol of azacyclo-2,3,alkene-2,chloro-N-carbochloride are used.

5. The compounds 3,nitro-azacyclo-alkanone-2-N-carbochlorides characterized by the formula:

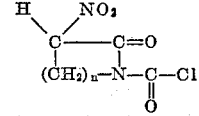

wherein $n$ is a whole number from 2 to 10 inclusive.

6. The compound 3,nitro-piperidine-2-one-N-carbochloride.

7. The compound 3,nitro-hexamethyleneimin-2-oxo-N-carbochloride.

No references cited.